INVENTORS
William C. Stevens
& Horace D. Stevens
BY Ely & Barrow
ATTORNEYS

Oct. 4, 1932.   W. C. STEVENS ET AL   1,880,518
APPARATUS FOR MAKING LAMINATED ARTICLES
Filed Nov. 6, 1930   7 Sheets-Sheet 3
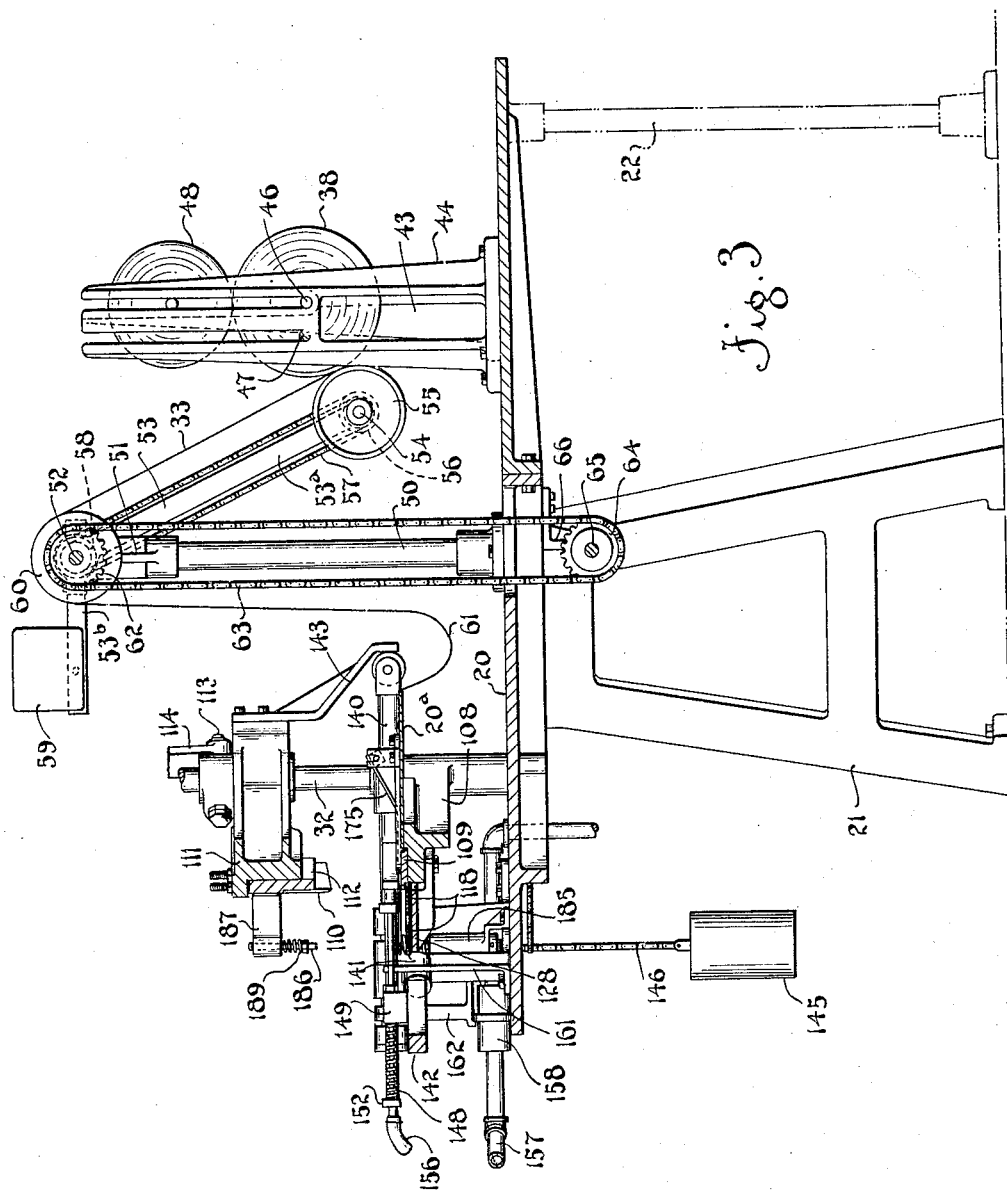
INVENTORS
William C. Stevens
& Horace D. Stevens
BY
Ely & Barrow
ATTORNEYS Oct. 4, 1932.   W. C. STEVENS ET AL   1,880,518
APPARATUS FOR MAKING LAMINATED ARTICLES
Filed Nov. 6, 1930   7 Sheets-Sheet 4
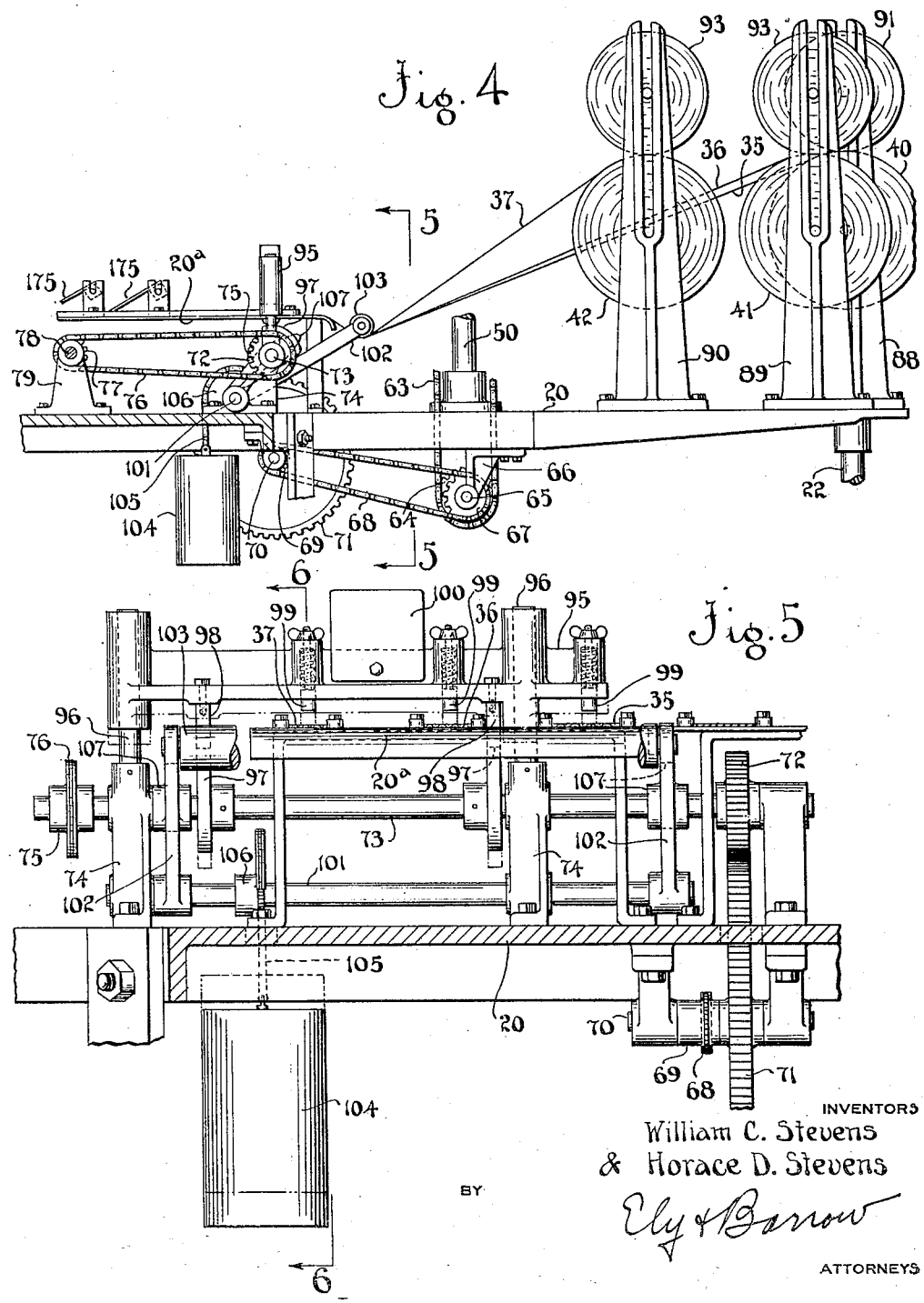

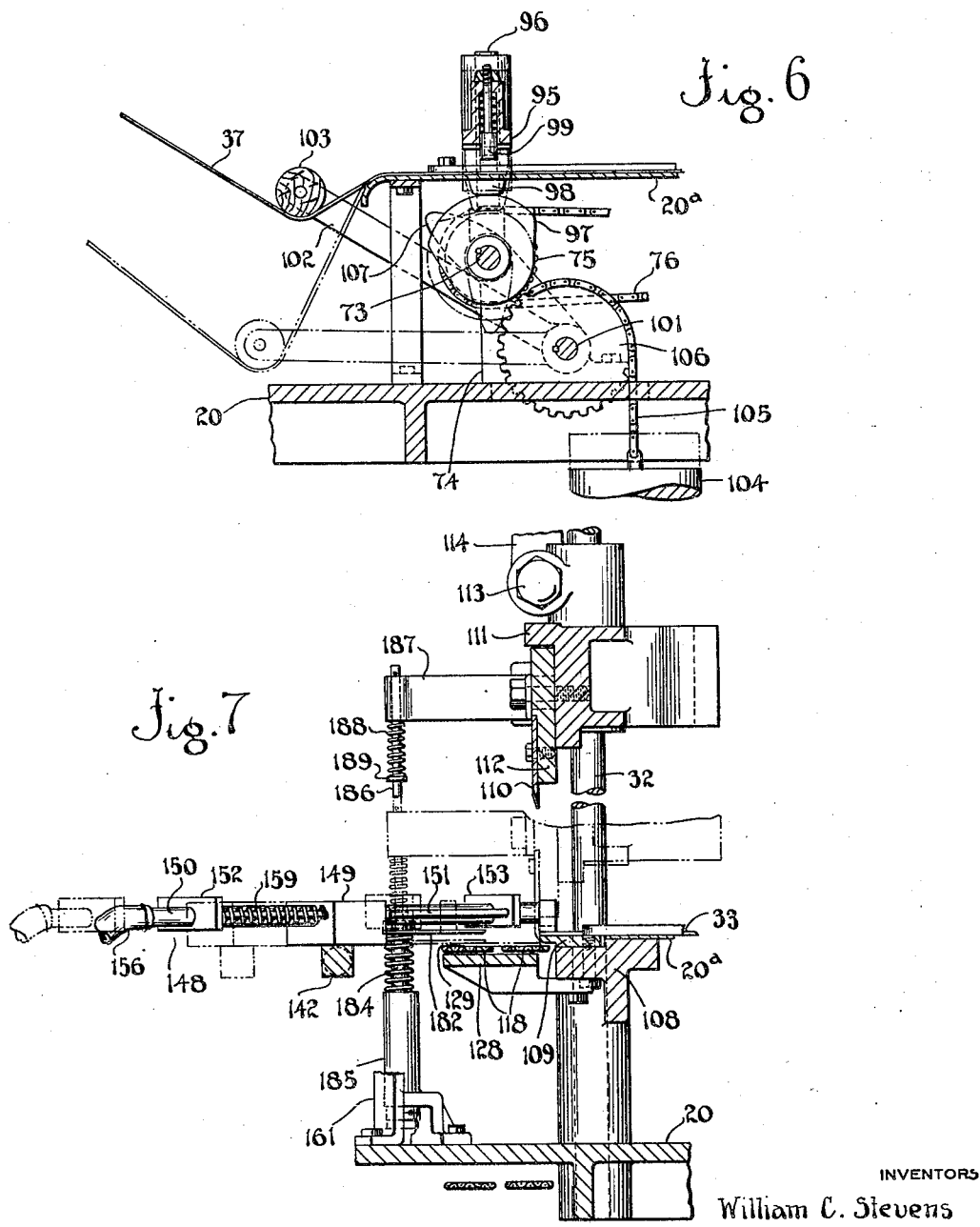

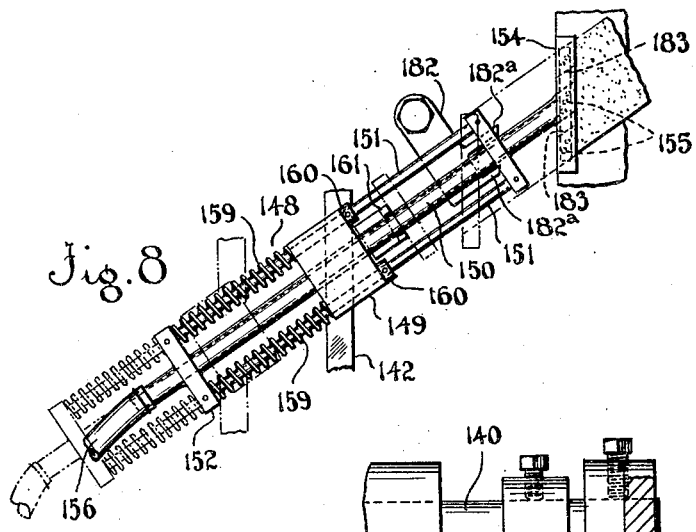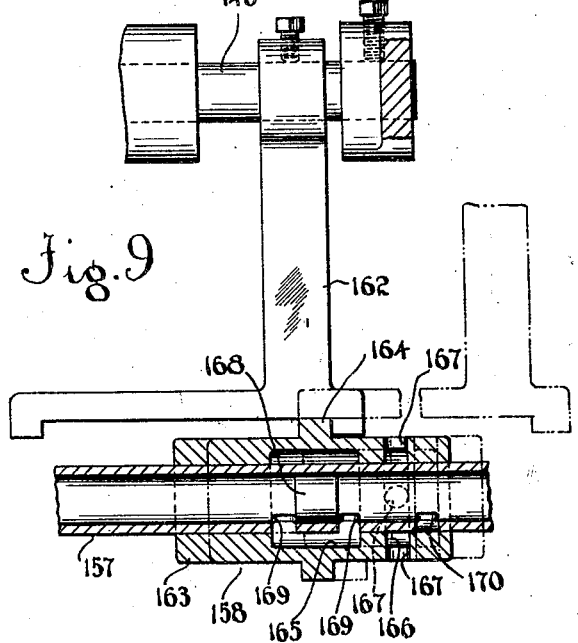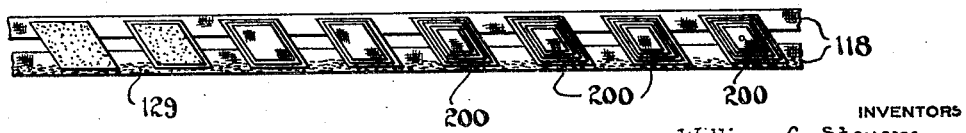

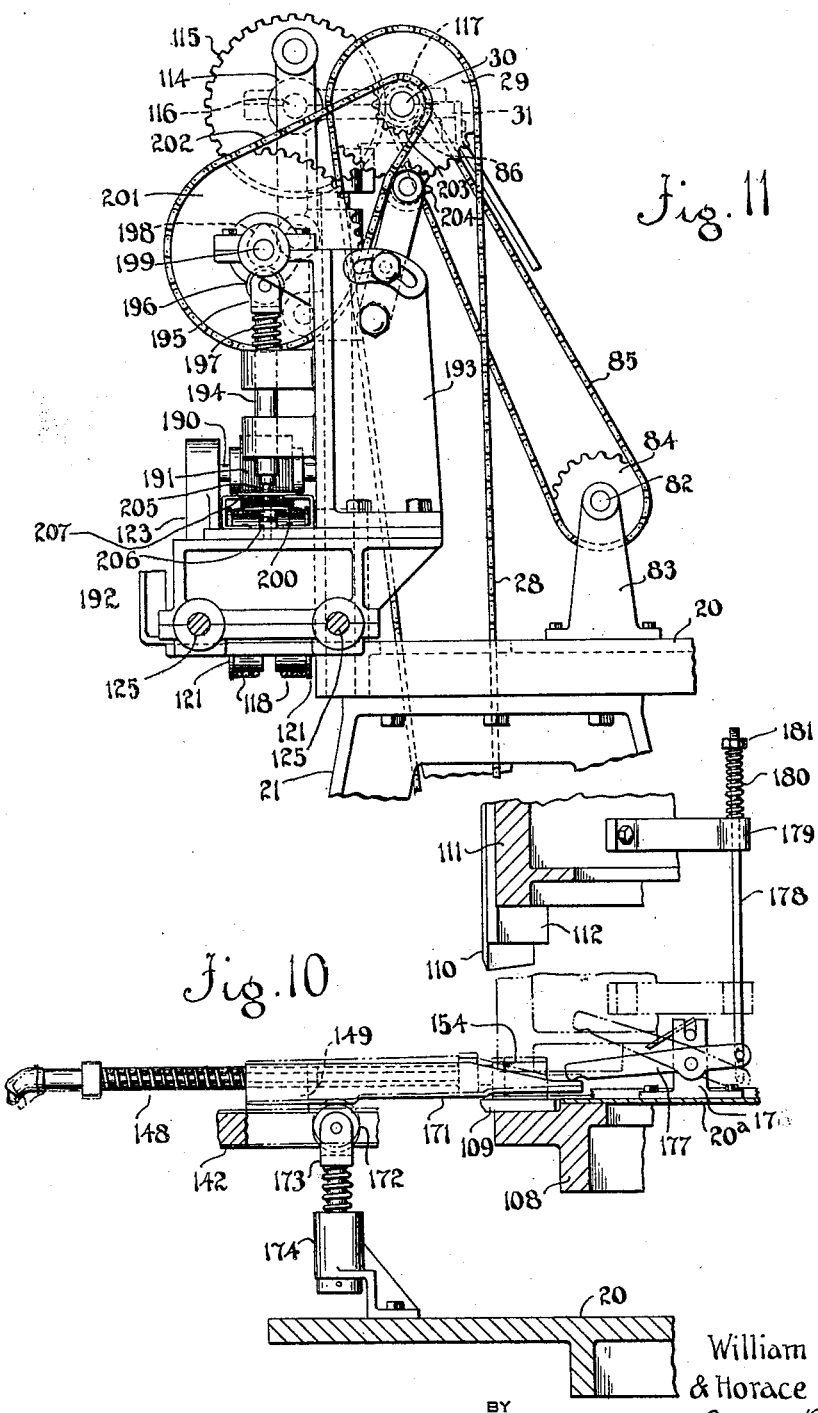

Patented Oct. 4, 1932

1,880,518

UNITED STATES PATENT OFFICE

WILLIAM C. STEVENS, OF UNIONTOWN, AND HORACE D. STEVENS, OF AKRON, OHIO, ASSIGNORS TO THE FIRESTONE TIRE & RUBBER COMPANY, OF AKRON, OHIO, A CORPORATION OF OHIO

APPARATUS FOR MAKING LAMINATED ARTICLES

Application filed November 6, 1930. Serial No. 493,786.

This invention relates to methods and apparatus for making laminated articles of sheet material such as, for example, the rhombus or diamond-shaped patches or pads of rubber and fabric used for reinforcing inner tubes for pneumatic tires at the place where the valve stem projects therethrough.

The chief object of the invention is to provide an automatic machine for producing laminated articles of the character mentioned. Another object is to provide mechanism for use in a machine of this character which will not distort or stretch the thin unvulcanized rubber used in forming one or more plies of the laminated article. Other objects will be manifest as the specification proceeds.

Of the accompanying drawings:

Figure 3 is a section on line 3—3 of Figure 1.

Figure 4 is a section on line 4—4 of Figure 1.

Figure 5 is a section on line 5—5 of Figure 4.

Figure 6 is a section of line 6—6 of Figure 5.

Figure 7 is a section of line 7—7 of Figure 1.

Figure 8 is a detail plan view of a member for feeding a strip of material.

Figure 9 is a sectional view, on a larger scale, of a fluid pressure valve associated with a strip feeding member.

Figure 10 is a detail side elevation of a strip feeding member, adjacent parts being shown in section.

Figure 11 is an elevation of hole-punching mechanism as viewed from line 11—11 of Figure 1.

Figure 12 is a plan view which illustrates the building up of the various component parts of the laminated articles upon a conveyor.

Figure 1:
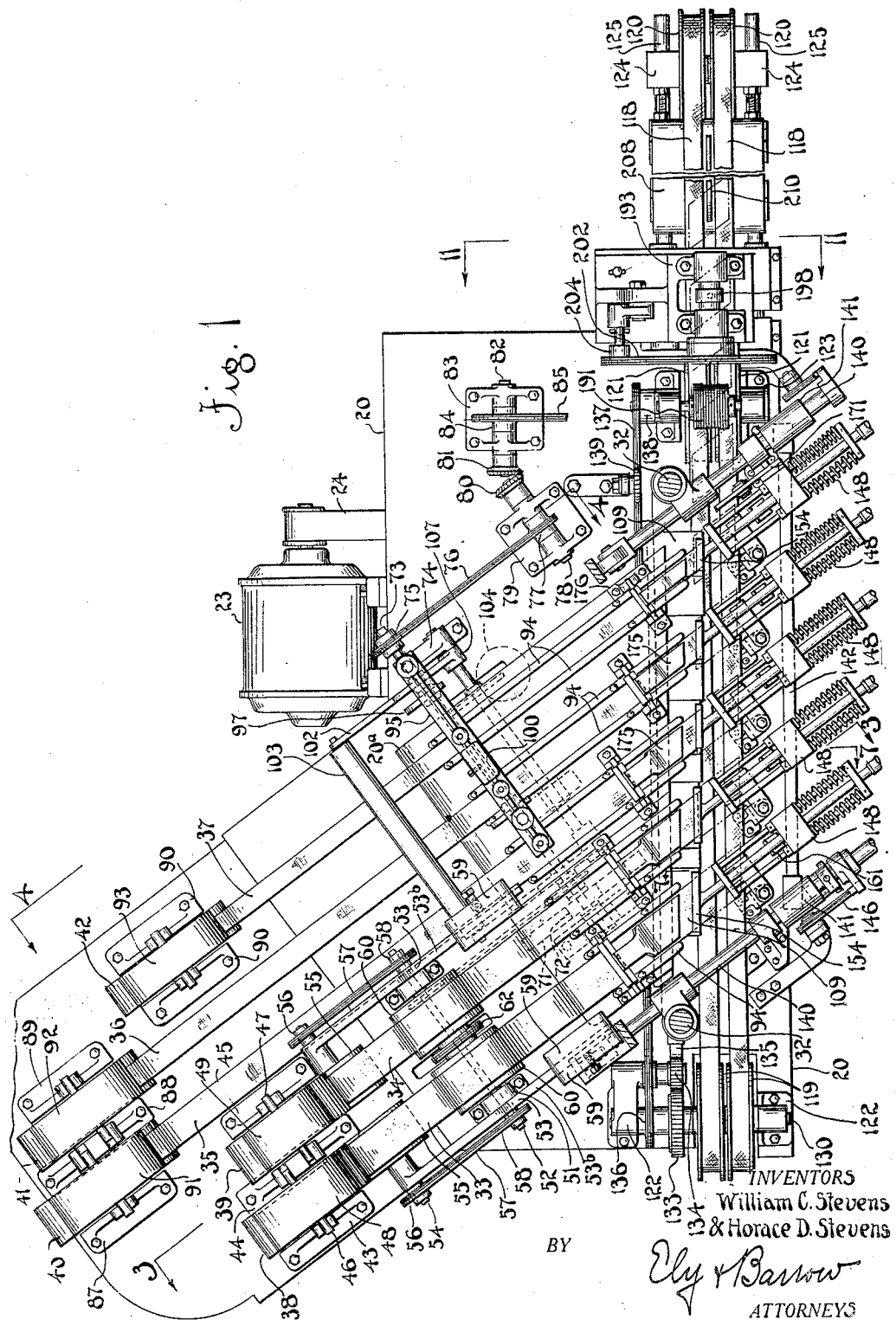
Figure 1 is a plan view of a portion of apparatus embodying and adapted to carry out the invention in its preferred form, as viewed from line 1—1 of Figure 2.

The machine herein illustrated supplies respective strips of material of different widths which are subsequently cut obliquely to produce rhombus or diamond-shaped pieces which are plied one upon the other to produce a laminated article, the margins of the respective plies being in stepped relation to each other. As herein shown, the articles are composed of five plies of material, the first two, or largest plies, consisting of thin sheet rubber and the other plies consisting of rubberized fabric. Strip material for the various plies of the articles is mounted in respective supply rolls, and is fed therefrom into storage loops, so that it may subsequently be fed to the cutting positions with but little effort. A dual conveyor belt advances intermittently past the cutting positions, the ends of the respective ply-strips being obliquely fed thereover before being severed. The assembled articles are pressed and then punched, after which they are lifted on one belt of the dual conveyor so as to be easily grasped and removed therefrom.

All of the strips are fed to cutting position by reciprocating mechanism which engages the leading ends of the several strips and pulls them forward a determinate distance and then releases them. The gripping of the respective strips by said reciprocating mechanism is effected by suction so that distortion or tearing of the rubber strips is avoided.

General features

Referring to the drawings, 20 is a base plate or table supported upon suitable frame members 21 and columns 22, and 20ª is a deck or support mounted upon the table 20, somewhat above the same at the front thereof.

Mounted upon the side of the table 20 is a motor 23 connected by a transmission belt 24 with a pulley 25 (Figure 2) on one end of a shaft 26 journaled in a bracket 26ª mounted upon the underside of the table 20. The other end of the shaft 26 is provided with a sprocket 27 which is connected by a sprocket chain 28 with a sprocket 29 on one end of a countershaft 30, the latter being journaled adjacent its ends in a pair of journal brackets 31, 31 on the upper ends of a pair of posts 32, 32 rising from the table 20 at the opposite sides thereof.

All of the operative mechanisms of the machine are driven, either directly or indirectly, from the countershaft 30. Driven directly from the countershaft 30 are the mechanisms for withdrawing the respective rubber strips and fabric strips from their supply rolls, a reciprocating head which severs the respective strips and a punch for forming a hole in the assembled articles. The endless dual conveyor on which the articles are assembled is intermittently advanced by the reciprocating cutter-head, and the mechanisms which draw the leading ends of the rubber and fabric strips forward to determinate positions beneath the cutters also are reciprocated by the said cutter-head.

*Strip propelling*

As hereinbefore stated, the laminated articles made in this apparatus consists of five plies, and said plies consist of material which is obliquely cut from continuous lengths or strips 33, 34, 35, 36 and 37 of said material, the strips 33, 34, consisting of rubber and the strips 35, 36 and 37 consisting of rubberized fabric. The strips 33 to 37 are of different widths, the strip 33 being widest, and the strips to the right thereof being successively narrower. The strips 33 to 37 inclusive are mounted in the machine, at the rear thereof, in supply rolls 38, 39, 40, 41 and 42, and are fed or drawn therefrom to the front of the machine, obliquely with relation to the conveyor belt, as is clearly shown in Figure 1. Since the strips 33, 34 consists of unvulcanized rubber which is easily deformable, it is required that suitable means be provided for withdrawing them from the supply rolls 38, 39 in a manner which will not stretch them.

Rising from the table 20 at the rear thereof are brackets 43, 44 and 45 which are suitably arranged and formed with vertical slots to receive pins or short bars 46, 47 upon which the supply rolls 38, 39 respectively are journaled. (See Figures 1 and 3.) Similarly mounted in the said brackets, above and resting upon the supply rolls 38, 39 are liner rewinding rolls 48, 49 adapted automatically to wind up the liner from the said supply rolls as the strips 33, 34 are withdrawn therefrom.

Rising from the table 20 somewhat in front of the bracket 44 is a post 50 upon the top of which is mounted a journal bracket 51 (see Figure 3) in which is journaled a driven shaft 52. Journaled upon the end portions of the shaft 52, outside the bracket 51, are respective angular levers 53, 53, each of which has a downwardly extending arm 53$^a$ having a shaft 54 journaled in its free end. One end of the shaft 54 is provided with a roller 55 adapted to bear against the supply-roll 38 or 39 of strip material, to drive the same, and the other end of the shaft 54 is provided with a sprocket 56 connected by a sprocket chain 57 with a sprocket 58 mounted upon the adjacent end of the shaft 52. Counterweights 59, 59 mounted upon the other arms 53$^b$ of the respective levers 53 normally urge the rollers 55 against the supply rolls 38, 39. Pulleys 60, 60 mounted upon the shaft 52 in alignment with the rollers 55 are adapted to receive the respective strips 33, 34 as the latter are withdrawn from their supply rolls, and feed said strips forward into festoons or supply loops such as the festoon 61, Figure 3.

For driving the shaft 52, we mount thereon, between the pulleys 60, a sprocket 62 which is connected by a sprocket chain 63 with a sprocket 64 mounted upon a shaft 65 journaled in brackets 66, 66 secured to the underside of the table 20. Also mounted upon the shaft 65 is a sprocket 67 connected by a sprocket chain 68 to a sprocket 69 mounted upon a shaft 70 which is journaled in suitable brackets on the underside of the table 20, somewhat forward of the shaft 65. The shaft 70 has mounted thereon a relatively large gear 71 (Figure 4) which extends through a slot in the table 20 and meshes with a pinion 72 above the table but beneath the deck 20$^a$, said pinion being mounted upon a cam-shaft 73 which is journaled in brackets 74, 74. (See Figures 4 and 5.) A sprocket 75 on the cam-shaft 73 is connected by a sprocket chain 76 with a sprocket 77 on a shaft 78 which is journaled in a bracket 79 on the table 20. One end of the shaft 78 is provided with a bevel gear 80 (Figure 1) meshed with a complemental gear 81 on the adjacent end of a shaft 82 journaled in a bracket 83 upon the table 20, the shaft 82 also having fast thereon a sprocket 84 connected by a sprocket chain 85 with a sprocket 86 mounted upon the driven countershaft 30.

The strips 35, 36 and 37 being of woven fabric are not readily stretched or deformed, and therefore no mechanism for driving their respective supply rolls 40, 41, and 42 is required. Thus the said supply rolls are simply rotatably mounted in slotted brackets 87, 88, 89 and 90 similar to the brackets 43, 44 and 45, and liner rewinding rolls 91, 92 and 93 are mounted upon the respective supply rolls to rewind the liner from the rolls as the strip material is withdrawn therefrom.

The respective strips 33, 34, 35, 36 and 37 in passing from their respective supply rolls to the cutting position at the front of the machine traverse the upper surface of the deck 20$^a$, and lateral guide strips 94, 94 are mounted upon said deck to hold the strips to a true course thereover.

In order that the strip feeding mechanism which draws the strips 35, 36 and 37 forward to cutting position will not be required to pull said strips from their supply rolls, we provide means for clamping the strips against the deck, and means for engaging the strips between the clamping means and the supply rolls for pulling them from the latter.

The strip-clamping means is most clearly shown in Figures 5 and 6 wherein 95 is a clamping head or beam positioned above the deck 20$^a$ and disposed transversely of the strips 35, 36 and 37. The beam is slidably mounted for vertical movement upon a pair of guide-posts 96, 96 which rise from the brackets 74 beneath the deck, and for intermittently raising and lowering the beam we provide a pair of aligned cams 97, 97 which are mounted upon the cam-shaft 73 and engage respective wear-plates 98, 98 secured to the underside of the beam. Adjustable spring-pressed detents 99, 99 are mounted in the beam 95 and project from the bottom thereof, said detents being so positioned as to engage and bear upon the respective strips 35, 36 and 37 when the beam is lowered to the position shown in broken lines in Figure 5. A weight 100 is mounted upon the beam 95 to cause the latter to follow the contour of the cams 97.

Mechanism for pulling the strips 35, 36 and 37 from their supply rolls comprises a rock-shaft 101 journaled in the brackets 74, a pair of arms 102, 102 extending rearwardly therefrom, and a roller 103 journaled between the free ends of said arms, and beneath which the strips 35, 36 and 37 pass. The arms 102 normally are urged upwardly by a counterweight 104 which is attached to one end of a sprocket chain 105 which passes partly around a sprocket 106 and has its other end secured thereto. The sprocket 106 is mounted upon the rock shaft 101, the weight 104 being so arranged as normally to turn the rock shaft in clockwise direction as viewed in Figure 6. Mounted upon the cam shaft 73 are aligned cams 107, 107 against which the arms 102 bear, and which are adapted periodically to swing them downwardly, against the pull of the counterweight 104, from the full-line position shown in Figure 6 to the broken line position shown therein.

The strips 35, 36 and 37 being securely held against backward movement by the detents 99, the result of the downward movement of the roller 103 is to pull said strips and thus to draw them from their respective supply rolls. The movements of the beam 95 and roller 103 are intermittent and in timed relation to the mechanism which feeds the strips forward to cutting position, so that the strips always are sufficiently slack that they impose no strain on the said feeding mechanism.

Cutting off mechanism

The front edge of the deck 20$^a$ rests upon a rigid support or bracket 108 extending across the front of the machine, and secured to the upper front edge of said bracket are a plurality of cutter members 109, 109 (Figures 3, 7 and 10) consisting of stationary blades, said blades being positioned in the paths of the respective strips 33, 34, 35, 36 and 37 which pass over them. The blades 109 are not in line, successive blades being positioned farther forward from left to right of the machine so as to provide different cutting positions for the several strips of material. Cooperating with the stationary blades 109 are movable blades 110 which are carried by a reciprocable cross-head 111, the latter being slidingly mounted for vertical movement upon the posts 32, 32. The blades 110 are mounted upon the front face of the crosshead 111 and extend below the lower edge thereof, there being spacer blocks 112, 112 of different thicknesses mounted behind the respective blades 110 to position successive blades farther forward, from left to right of the machine, so that they properly engage the stationary knives 109.

Pivotally connected to the respective ends of the cross-head at 113, 113 are links 114, the other ends of which are eccentrically connected to the lateral faces of respective gears 115, 115 which are mounted upon opposite ends of a shaft 116. The shaft 116 is journaled in the brackets 31, parallel to the counter shaft 30, and the gears 115 mesh with respective pinions 117 (Figure 11) on the shaft 30 and are driven thereby. The arrangement is such as to impart periodic reciprocation to the crosshead 111 in timed relation to the strip-propelling mechanism hereinbefore described.

Dual conveyor

Extending across the front of the machine and a substantial distance to the right thereof is an endless dual conveyor comprising a pair of parallel conveyor belts 118, 118, which are mounted at one end, (the left as shown in the drawings) upon a pair of driven pulleys 119, 119, and at the other end upon idler pulleys 120, 120, there being an intermediate pair of driven supporting pulleys 121, 121 positioned a short distance to the right of the last pair of cutters 109, 110. The pulleys 119, 121 are suitably journaled in respective brackets 122, 123 mounted upon the table 20, and the pulleys 120 are journaled in slide-blocks 124 adjustably mounted upon a pair of supporting bars 125, 125 extending to the right of the table 20, the bars 125 being supported at one end upon the table 20 and at their other ends in a bracket 126 mounted upon a post 127 rising from the floor. The arrangement provides means for keeping the conveyor taut. The conveyor is so positioned as to receive, upon the upper reach of both belts 118, the pieces of material severed by the knives 109, 110 from the leading ends of the strips 33 to 37 inclusive. Between the pulleys 119, 121 the upper reach of the conveyor is provided with a rigid support 128 secured to and extending from the bracket 108. The upper face of the dual conveyor is slightly below the blades 109 and its adjacent edge is back of the cutting edges of said blades as is most clearly shown in Figure 7. Preferably the near belt 118 has its surface treated with suitable adhesive material as indicated at 129, Figures 7 and 12 so that the work will adhere thereto.

The conveyor is adapted to be periodically advanced in timed relation to the reciprocation of the crosshead 111, and such advance is a determinate distance equal to the spacing of the strips 33 to 37 from each other, so that successive pieces severed from the leading ends of said strips and applied to the conveyor will be superposed centrally upon previously applied pieces whereby laminated, rhombus-shaped articles such as are shown at 200, 200, are built up, the margins of the respective plies of the articles being uniformly stepped back from each other as is therein shown.

For periodically moving the dual conveyor, the shaft 130 upon which the pulleys 119 are mounted is provided with a ratchet 131 engaged by a pawl 132 (Figure 2) pivotally mounted within a gear 133 which is journaled upon the shaft 130. The gear 133 meshes with an idler pinion 134 journaled on an extension of the rear bracket 122, and the pinion 134 is meshed with a vertical rack 135 extending downwardly from the crosshead 111. The arrangement of the pawl 132 and ratched 131 is such that the dual conveyor is advanced a determinate distance each time the crosshead rises.

Also mounted upon the pulley-shaft 130 is a sprocket 136 (Figure 1) connected by a sprocket chain 137 with a sprocket 138 on the shaft of the conveyor-pulleys 121 for driving the latter. An adjustably mounted sprocket 139 is provided for tightening the sprocket chain 137.

*Strip-feeding mechanism*

For feeding the several strips 33 to 37 forward a determinate distance so that their leading ends extend different distances beyond the cutting edges of the of the blades 109, 110, we provide mechanism operating in timed relation to the reciprocating crosshead 111 for advancing and engaging the several strips by suction, retracting and thus drawing the strips forward, and then releasing the strips as they are severed by the respective cutters. Means also is provided for pressing the severed pieces to the underlying conveyor, or previously severed pieces thereon, as they are severed from the respective strips.

The bracket 108 is formed at its ends, adjacent the posts 32, with horizontal guideways for a pair of rods 140, 140 slidably mounted therein, the guideways being so angularly disposed that the movement of the rods 140 is parallel to the course of the strips 33 to 37. Adjacent their front ends the rods 140 are provided with respective brackets 141, 141 in which the respective end portions of supporting bar 142 are swivelled, the rods 140 and bar 142 constituting a slide. For reciprocating said slide in timed relation to the movement of the crosshead 111, the end portions of the latter are provided with respective cams 143, 143 which are engaged by cam rollers 144 journaled on the inner ends of the rods 140, the arrangement being such that the rods 140 move forward when the crosshead moves downward. Counterweights 145, 145 on the ends of chains 146, 146 which pass over sprockets 147 and are secured to the forward ends of the respective rods 140 are provided for urging the said rods rearwardly, against the cams 143, when the crosshead 111 rises.

Angularly mounted upon the bar 142 of the slide opposite the ends of the strips 33 to 37 and disposed parallel thereto are a plurality of work-engaging members 148, 148 comprising suction fingers which are adapted to engage the leading ends of the respective strips 33 to 37 at the end of the inward movement of the slide and then to release the strips at the end of the outward movement of the slide. The members 148 are substantially identical in construction so that a description of one will suffice for all.

Referring to Figure 8, each member 148 comprises a block 149 which is fixed to the bar 142. Slidably mounted in the block 142 is a tube 150 and a pair of guide-rods 151, 151 at each side thereof. The front and rear ends of the rods 151 are connected by respective yokes 152, 153, the tube 150 extending through both yokes and being welded to each of them. Beyond the rear yoke 153 the tube 150 is provided with an angularly disposed suction-head 154 formed with a plurality of apertures 155, 155 on its bottom face through which suction is applied to the work. The front end of the tube 150 is connected by a flexible pipe or conduit 156 with a manifold 157 leading to a source of suction (not shown), there being a valve 158 in said suction line. Compression springs 159, 159 are mounted upon the guide-rods 151 between the front yoke 152 and the block 149 for normally urging the front yoke toward the left as viewed in Figure 8, and stop-collars 160, 160 are mounted upon the respective rods 152 at the right of the block 149 for limiting such movement and thus defining the normal position of the suction-head 154 with relation to the bar 142. The collars 160 are differently positioned on the several members 148 to provide different relative positions for the respective suction-heads 154, this being due to the different positions of the leading ends of the strips 33 to 37 because of the different cutting positions.

Since all the margins of the plies of the articles 200 are stepped back from each other, it is necessary that the strips 33 to 37 be drawn forward different distances, and this is accomplished by stopping the forward movements of the suction-heads 154 at different selective positions while the slide as a whole continues to move. For so stopping the suction-heads, brackets 161 are mounted upon the table 20 beneath the respective members 148 at different positions relative to the front edge of the table, each of said brackets being formed with a forked portion which straddles a tube 150 and is adapted to engage the rear yoke 153 of a member 148 as the latter moves forwardly with the slide, and to hold said yoke and suction head stationary as the slide continues to move forwardly against the pressure of the springs 159.

For establishing and releasing suction in the suction-heads 154 at determinate intervals timed with the reciprocation of the slide, one of the rods 140 is provided with a shipper-arm 162 for operating the valve 158 in the suction pipe 157. As is most clearly shown in Figure 9, the valve-engaging end of the arm 162 comprises a wide fork whereby to provide lost motion so that relatively long movement of the rod 140 produces but relatively short movement of the operative member of the valve. The valve 158 comprises a sleeve 163 which is slidably mounted upon the pipe 157 and formed with a radial flange 164 which is engaged by the forked end of the arm 162. The sleeve 163 is formed internally with a relatively wide circumferential recess 165 constituting a by-pass, and with a relatively narrow circumferential recess 166 provided with a plurality of exhaust ports 167, 167. The pipe 157 is provided with an internal obstruction or plug 168, and is formed at opposite sides of the latter with ports 169, 169, and has a third port 170 spaced slightly therefrom. The arrangement is such that when the slide is in its rearmost position the parts are in the positions shown in full lines in Figure 9, the by-pass 165 of the sleeve 163 making connection between the ports 169, 169 and the port 170 being closed. This arrangement connects the suction heads 154 with the source of suction.

When the slide is in its forward position, the sleeve 163 is in the broken line position shown, whereby suction in the suction heads is broken by air entering the pipe 157 through the ports 167, 170 which are then in registry, the by-pass 165 being out of registry with the ports 169, 169. The provision of lost motion between the movement of the slide and the valve causes suction to enter the suction-heads 154 at the limit of their rearward movement, and to be broken at the limit of their forward movement.

The rearward movement of the slide carries the respective suction heads 154 over the leading ends of the several strips 33 to 37 and during this movement they are raised slightly to clear the strips should the latter be slightly curled, and are then forced down upon the strips to assure that the suction in the heads will grip the strips.

For so manipulating the several suction-heads as described, a cam 171 (see Figure 10) is secured to the block 149 of the member 148 at the extreme right of the series of members 148, said cam having its lower edge resting upon a cam-roller 172 which is journaled in a yielding support 173 carried by a bracket 174 mounted upon the table 20. The cam 171 extends rearwardly beyond the suction heads, the arrangement being such that during the rearward movement of the slide, the cam in passing over the cam-roller 172 is tilted upwardly and, by rocking the bar 142 of the slide, lifts all the suction heads 154 as they pass over the ends of the several strips 33 to 37. Pivotally mounted holddown members 175, 175 rest upon the respective strips 33, 37 as close to the cutting position as is practical to reduce the tendency of the strips to curl.

Pivotally mounted in a bracket 176 on the deck 20ᵃ is a trip-lever 177 the rear end of which is connected to a vertical pull-rod 178 which is slidably mounted in a bracket 179 secured to and extending rearwardly from the cross-head 111, there being a compression spring 180 mounted upon the pull-rod between the bracket 179 and a nut 181 on its upper end. The forward end of the lever 177 is disposed above the position of the rear end of the cam 171 when the latter is in rearmost position. The weight of the pull-rod 178 is sufficient to hold the free end of the lever 177 normally in raised position so that the end of the cam 171 passes freely thereunder. Upward movement of the cross-head 111 causes the free end of the lever 177 to descend upon the cam, and, by depressing the latter against the pressure of the yielding support 173 of the cam-roller 172, to rock the bar 142 and thus to cause the several suction-heads 154 to engage the respective strips 33 to 37.

To assure that the pieces severed from the ends of the respective strips 33 to 37 will not adhere to the suction heads and will be placed firmly and accurately upon the conveyor or upon pieces previously deposited upon the latter, a yielding presser-foot 182 is mounted beneath each strip-feeding member 148, and formed with a pair of rearwardly extending fingers 182ᵃ, 182ᵃ (Figure 8) which are aligned with a pair of oblique slots 183, 183 (Figure 8) formed in the bottom face of each suction head 154. The fingers 182ª extend over the near belt 118 of the dual conveyor, and are so positioned that they enter the slots 183 in the suction heads when the latter move to forward position, and thus are above the ends of the strips carried by said suction heads.

Each presser-foot 182 is mounted upon the upper end of a spring-backed vertical post 184 slidably mounted in a bracket 185 on the table 20, to one side the strip-feeding member 148. The post 184 is depressed to cause the fingers 182ª to strip the material from the suction head by a push rod 186 slidably mounted in a bracket 187 projecting from the front of the cross-head 111, a compression spring 188 being mounted upon the push-rod between a collar 189 thereon and the bracket 187. The arrangement is such that downward movement of the cross-head carries the several push-rods 186 yieldingly into engagement with the presser-feet 182, and depresses the latter as the blades 109, 110 sever the strips 33 to 37, the severed portions of the latter being concurrently pressed against the underlying conveyor and work thereon. Upward movement of the cross-head 111 carries the push-rods 186 upwardly out of engagement with the presser-feet which automatically restore themselves to normal raised position.

Above the dual conveyor the pulley bracket 123 carries a fixed shaft 190 upon which is journaled a plurality of laterally abutting discs constituting a presser roll 191. Preferably the discs are formed with axial apertures somewhat larger than the shaft 190 so that each disc may move independently of the other discs. Thus the roll 191 is adapted to apply uniform compacting pressure upon all parts of the articles 200 as the latter are carried thereunder upon the conveyor.

Punch

At the delivery side of the presser-roll 191 is a device which may be used alternatively for punching holes in successive pads 200 as they pass thereby, or for impressing shallow recesses in respective pads to indicate where holes subsequently are to be punched therein. The punching device comprises a base member 192 mounted upon the bars 125 below the dual conveyor, and an upright structure 193 carried by the said base member and extending above and over the said conveyor.

Slidably mounted in suitable apertured ears extending from the front face of the member 193 is a vertical punch holder 194 which is positioned over the space between the belts 118 of the dual conveyor. The upper end of the punch holder 194 is formed with a yoke 195 in which is journaled a cam-roller 196, and the holder 194 is normally urged upwardly by a compression spring 197 mounted upon the holder between the yoke 195 and the upper apertured ear. Reciprocating movement is imparted to the punch holder 194 by a cam 198 which is mounted upon a shaft 199 journaled in the upper portion of the structure 193, said shaft having one of its ends provided with a sprocket 201 connected by a sprocket chain 202 with a sprocket 203 mounted upon the adjacent end of the countershaft 30. An adjustable chain tightener comprising a sprocket 204 in engagement with the sprocket chain 202 is mounted upon the structure 193.

The ratio of the sprockets 201, 203 is such that the punch holder makes one complete reciprocation during the interval required for the conveyor to advance and pause. The distance of the punch from the right of the last cutting position is an even multiple of the distance between respective cutting positions, and is an even multiple of the distance the conveyor advances during each operative cycle of the machine. Thus during each pause of the conveyor an article 200 thereon is directly beneath the punch holder 194, and the downward movement of the punch is timed to occur during such pause of the conveyor.

Mounted in the punch-holder 194 is a punch 205, and a die 206 complemental thereto is mounted upon the base member 192 between the belts 118 and sufficiently below the same so that the articles 200 on the belts pass over the die. The punch 205 operates through the usual stripping plate 207 which assures withdrawal of the punch from the work.

If instead of punching holes in the respective articles it is desired only to impress a shallow recess therein, the die 206 is removed and a yieldingly mounted, pointed tool is substituted, which tool is merely pressed against the underside of the work when the punch presses the work thereagainst.

Work-removing station

Figure 2:
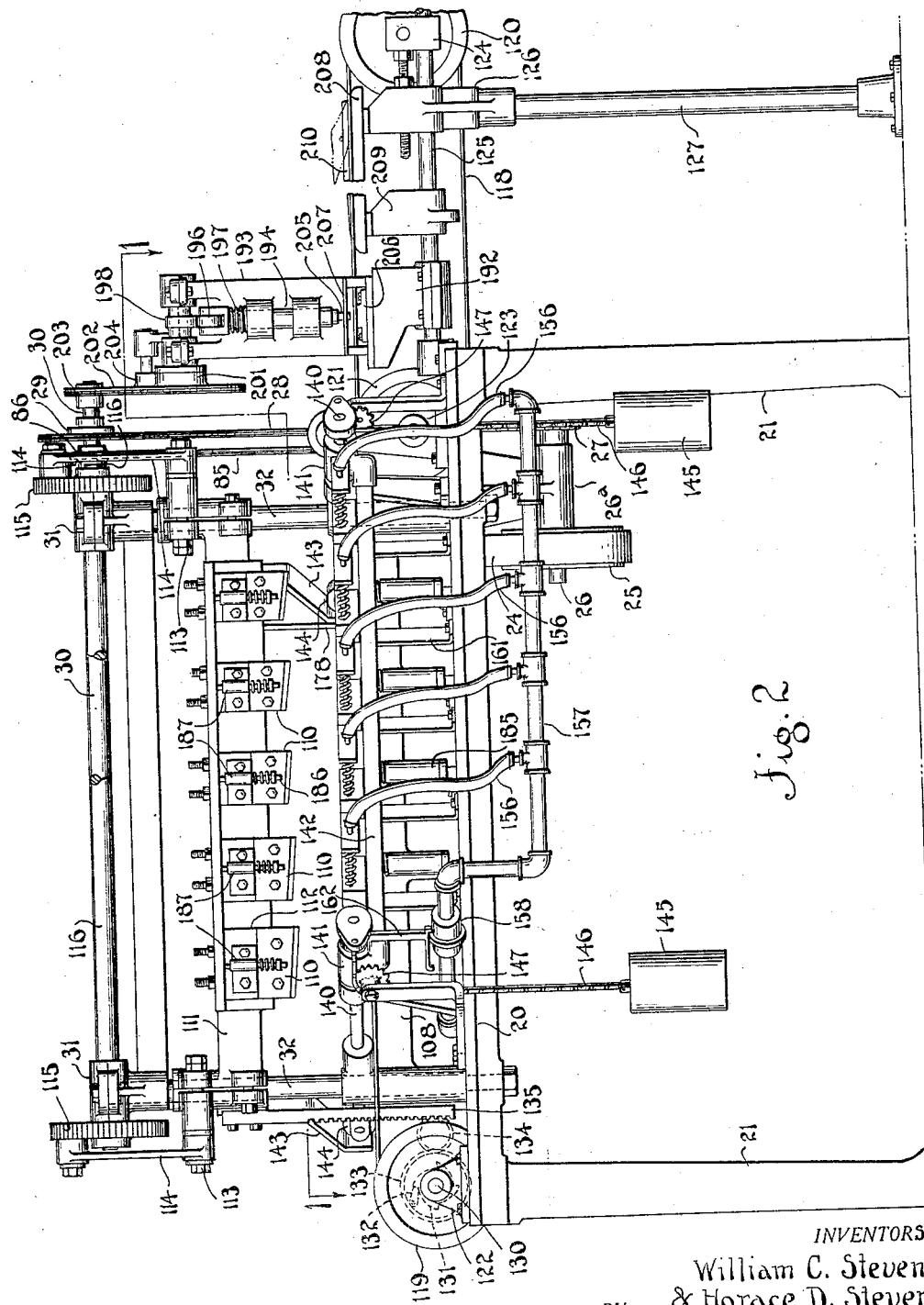
Figure 2 is a front elevation of the entire apparatus.

At the right of the punch mechanism described is a work-removing station where the finished articles are removed from the conveyor and placed in suitable books. The station comprises a table 208 mounted at one end upon a bracket 209 carried by the bars 125, its other end being supported upon the bracket 126. The belts 118 ride upon the table 208, and a rail or cam 210 is mounted upon the latter, between the belts, and has its upper margin disposed somewhat above the tops of said belts. The end of the rail 210 nearest the punch mechanism is tapered or sloped as shown in Figure 2, the arrangement being such that the articles 200 on the conveyor ride up and onto the rail, which is of such height as to raise that edge of each article which is not adhered to the conveyor by the adhesion 129. The articles are then so positioned as to be easily grasped by the operator and removed from the conveyor.

Operation

In the operation of the apparatus, the respective supply rolls 38, 39, 40, 41 and 42 are mounted in their respective supports, and the strips of material 33, 34, 35, 36 and 37 therefrom are threaded through the machine as described until their leading ends are at the cutting positions adjacent the front of the machine, the liners from the respective supply rolls being started onto the respective liner-rewinding rolls 48, 49, 91, 92 and 93. The motor 23 is then set in motion to operate the various instrumentalities of the machine in determinate timed sequence, whereby the laminated, apertured valve pads 200 are automatically assembled, and delivered from the machine upon the dual conveyor.

The continuous strips 33, 34 are fed from their supply rolls at constant speed by the driven rolls 55, which speed is substantially the same as the speed at which the strips are consumed. Variations of said speeds shorten or elongate the storage loops 61 of said strips, and an operator manually adjusts the storage loops when they become excessively shortened or elongated. The strips 35, 36 and 37 are withdrawn from their storage rolls by the pull of the roller 103 which moves downwardly against the strips as they are held against backward movement by the strip-clamping mechanism, the latter being actuated during the intervals when the strips are stationary, between cutting operations.

In timed sequence with the operation of the strip-propelling mechanism described, the cross-head 111 rises and falls and thus severs, by means of the blades 109, 110, pieces from the leading ends of the respective strips 33 to 37. Because of the oblique relation of the cross-head to the course of the strips, the pieces cut from the latter are rhombus or diamond-shaped. The severed pieces of the strips fall upon the dual conveyor, which is indexed in timed relation to movement of the cross-head so as to advance a distance equal to the spacing of the respective strips 33 to 37 during the time that the cross-head is rising. Thus during the succeeding cutting operation the severed pieces fall upon the pieces previously cut and thus build up the laminated articles 200. The different widths of the strips 33 to 37 provides stepped margins of the plies of the articles on two sides, and pieces of different lengths are cut from the respective strips to provide stepped margins on the other sides of the articles.

The strips 33 to 37 are fed longitudinally to cutting position by the strip-feeding mechanisms 148 which engage and draw the strips forward during the interval that the cross-head is rising and descending, this movement of the mechanisms 148 being effected by the cam 143 on the cross-head which actuates the slide on which the said mechanisms are mounted. When the slide reaches its rearmost position, the lever 177 is actuated by the cross-head to engage and depress the cam member 171 to tilt the supporting bar 142 of the slide and thereby to move the suction heads 154 of the several mechanisms 148 downwardly into engagement with the leading ends of the respective strips 33 to 37. Also in its rearmost position the slide has opened the valve 158 to admit suction to the suction heads, so that as the cross-head descends and moves the slide forwardly the strips 33 to 37 are drawn along therewith. The positions of the various brackets 161 determine when the forward movement of the suction heads stops, notwithstanding continued forward movement of the slide, and thus produce the stepped condition of the article-plies along the front thereof, while a similar stepped condition along the rear thereof is produced by the different relative positions of the cutters.

Continued step-by-step movement of the dual conveyor carries the work thereon beneath the presser roll 191 where the plies thereof are compressed into firm adhesive engagement with each other. The conveyor then carries the work past the punching device which operates in timed relation to the conveyor to perforate successive articles on the latter during successive pauses in its movement. As the conveyor carries the articles over the table 208, the cam 210 on the latter lifts them off one of the belts 118 so they may be easily grasped by an operator.

The invention may be variously modified within the scope of the appended claims which are not limited wholly to the specific construction shown or exact procedure described.

What is claimed is:

1. In apparatus for making laminated articles, the combination of a pair of spaced-apart carriers, means for intermittently advancing the same in unison, means for constructing a succession of articles upon the carriers spanning the space between them, and a punch operating through the space between the carriers for perforating successive articles during pauses in the movement of the carriers.

2. In apparatus of the character described, the combination of an endless conveyor, means for advancing the same, means for constructing a succession of articles upon the conveyor and adhesively attaching them thereto, and means for successively lifting a portion of each article from the conveyor as it moves forward.

3. In apparatus of the character described, the combination of a pair of parallel, spaced-apart, endless carriers, means for intermittently advancing the same, means for constructing a succession of articles upon the carriers spanning the space between them, and a cam extending through the space between the carriers for lifting the articles therefrom.

4. Apparatus as defined in claim 3 including a punch operating through the space between the carriers in timed relation to the movement thereof for forming apertures in successive articles.

5. In apparatus of the character described, the combination of an intermittently moving conveyor, means for delivering a plurality of strips of material to one side of the conveyor, suction means on the other side of the conveyor adapted to engage the leading ends of the said strips and draw them over the conveyor, and means for severing said leading ends from said strips.

6. Apparatus as defined in claim 5 including means for coordinating the movements of the conveyor, the strip-feeding means, and the strip-severing means.

7. In apparatus of the character described, the combination of an intermittently moving conveyor, means for feeding the leading ends of strips of sheet material over the conveyor, said feeding means including suction means for engaging the strips, and means for severing the leading ends of said strips and depositing them on the conveyor.

8. In apparatus of the character described, the combination of an intermittently moving conveyor, means for delivering strips of sheet material to one side thereof, means on the opposite side of the conveyor for engaging the leading ends of said strips and feeding them over the conveyor, said strip-feeding means gripping the strips by suction, and means for severing the leading ends of said strips.

9. In apparatus of the character described, the combination of an intermittently moving conveyor, means for delivering strips of sheet material to one side thereof, suction heads on the other side of said conveyor, a reciprocating cutter head, and means for reciprocating the suction heads in timed relation to the cutter-head to cause them to engage the leading ends of the strips and draw them over the conveyor into position to be severed by the cutter.

10. Apparatus as defined in claim 9 including means for moving the conveyor in timed relation to the movements of the cutter-head and suction-heads.

11. In apparatus of the character described, the combination of an endless conveyor, means for delivering a strip of material to one side thereof, a slide on the opposite side of the conveyor, a suction-head on said slide, means for reciprocating the slide to carry the suction-head across the conveyor to engage the leading end of the strip and to draw a determinate length thereof over the conveyor, and means for severing that portion of the strip over the conveyor.

12. Apparatus as defined in claim 11 including means for moving the suction-head relatively of the slide.

13. In apparatus of the character described, the combination of a conveyor, means for delivering a plurality of strips of sheet material to one side of the conveyor, a slide on the opposite side of the conveyor, strip-engaging heads on said slide, means for reciprocating the slide to cause the strip-engaging heads to cross the conveyor, engage the respective strips, and draw the leading ends thereof over the conveyor, means for stopping the return movement of strip-engaging heads independently of the movement of the slide, and means for severing the leading ends of said strips.

14. Apparatus as defined in claim 13 in which the means for stopping the return movement of the strip-engaging heads engages the respective heads at different relative positions with respect to the strip-severing means.

WILLIAM C. STEVENS.
HORACE D. STEVENS.